(12) United States Patent
von Vistauxx

(10) Patent No.: US 11,570,157 B2
(45) Date of Patent: *Jan. 31, 2023

(54) TRANSENCRYPTING METHOD AND APPARATUS FOR REMOVING INFORMATION FROM DATA TRANSMITTED OVER NETWORKS AND STORED IN DATA STORAGE FACILITIES

(71) Applicant: TFOR LLC, Reston, VA (US)

(72) Inventor: David von Vistauxx, Silver Spring, MD (US)

(73) Assignee: TFOR LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,746

(22) Filed: Apr. 7, 2020

(65) Prior Publication Data

US 2020/0236092 A1    Jul. 23, 2020

Related U.S. Application Data

(63) Continuation of application No. 16/091,975, filed on Oct. 9, 2018, now Pat. No. 10,616,191.

(51) Int. Cl.
| | |
|---|---|
| *H04L 29/06* | (2006.01) |
| *H04L 9/06* | (2006.01) |
| *H04L 12/701* | (2013.01) |
| *H04L 9/40* | (2022.01) |
| *H04L 45/00* | (2022.01) |

(52) U.S. Cl.
CPC ........ *H04L 63/0457* (2013.01); *H04L 9/0662* (2013.01); *H04L 29/06* (2013.01); *H04L 45/00* (2013.01); *H04L 63/0428* (2013.01); *H04L 2209/04* (2013.01)

(58) Field of Classification Search
CPC ... H04L 45/00; H04L 63/0457; H04L 9/0662; H04L 63/0428; H04L 29/06; H04L 2209/04

See application file for complete search history.

(56) References Cited

U.S. PATENT DOCUMENTS

| | | | |
|---|---|---|---|
| 7,408,938 B1 * | 8/2008 | Chou | H04H 20/42 370/394 |
| 10,616,191 B2 * | 4/2020 | von Vistauxx | H04L 63/0478 |
| 2002/0054679 A1 * | 5/2002 | Vesely | H04L 9/0662 380/46 |

(Continued)

*Primary Examiner* — Mohammad A Siddiqi

(74) *Attorney, Agent, or Firm* — Clyde R Christofferson, Esq.

(57) ABSTRACT

Information is removed from data transmitted over networks and stored in data storage facilities by generating non-informational data as an output from a series of nodes (routers, computing devices or logical routing applications) by using a function that applies random data to the data received at each node. The function may be an XOR and the random data may be a pseudorandom string of the same length as the informational data. The non-informational data may be managed normally without concern for security. When the informational data is needed it can be re-generated using the non-informational data and a cascade of the random data from the series of nodes as inputs to an inverse function (XOR is its own inverse). The random data may be generated from a smaller random seed.

20 Claims, 4 Drawing Sheets

(56) References Cited

U.S. PATENT DOCUMENTS

| | | | | |
|---|---|---|---|---|
| 2002/0126685 A1* | 9/2002 | Leatherbury | ...... | H04N 21/6168 |
| | | | | 370/432 |
| 2003/0113059 A1* | 6/2003 | BuAbbud | .............. | H04N 21/23 |
| | | | | 385/24 |
| 2006/0050736 A1* | 3/2006 | Segel | ................ | H04B 7/18591 |
| | | | | 370/474 |
| 2010/0050027 A1* | 2/2010 | Marr | ................ | H03M 13/3761 |
| | | | | 714/701 |

* cited by examiner

TRANSENCRYPTING METHOD AND APPARATUS FOR REMOVING INFORMATION FROM DATA TRANSMITTED OVER NETWORKS AND STORED IN DATA STORAGE FACILITIES

BACKGROUND

The widespread use of electronic data transmission utilizing various networking technologies including, but not limited to, IPv4, IPv6 and various streaming technologies have inherent vulnerabilities and potential leakage. In addition, the recently added technology currently referred to as "Software Defined Networking" (SDN) allows routing of packets and streams from a starting point to an end point without the traditional transitions through hardware routers. SDN is an approach to networking that allows management of network behavior by administrators by decoupling the system that makes decisions about where traffic is sent (commonly referred to as SDN Controllers) from the underlying systems that forward traffic. This abstraction of lower-level functionality is meant to address the fact that the static architectures of traditional networks don't support the dynamic, scalable computing, routing, and storage needs of modem computing environments like cloud computing and modern data centers. Artifact data is used to encapsulate the information as each of these hardware routers forwards the information.

With recent changes in laws, both domestic and international, it is possible that the mere transition of a packet or stream through a specific jurisdiction would have legal ramifications for the information contained in the packet or stream. Corporations, large and small, and governments (at all levels) utilize various techniques to ensure that their data is not compromised during this transmission. Notably they will either use end to end encryption or technologies such as Virtual Private Networking (VPN). In some uses only a very expensive point-to-point physical connection (either optical or electrical) is permitted to ensure against compromise. These technologies (other than the very expensive point-to-point connections) provide no assurance that the information (in its encrypted form) was not disclosed to a third party, nor do these technologies assure where (in jurisdictional terms) a portion or the entire stream of packets has been. A single compromised router in the transmission chain or a forced change in the routing table (using standard routing table broadcast techniques) to force packets and streams through a compromised router can disclose this information (even if encrypted in form) to unauthorized third parties.

Corporations, government agencies, and individual home users have been the victims of embarrassing and costly breaches of routers, and once breached and the encrypted information disclosed, it is merely time before the key can be ascertained. The time to ascertain this key has been dropping following a near geometric, not linear, curve. A wide variety of techniques for protecting computer networks are known, including but not limited to firewalls, password protection and encryption. However, such techniques may need to be frequently updated in order to defend against newly developed attack techniques and newly discovered vulnerabilities. Moreover, such techniques do not guarantee security. For example, encrypted and password-protected information may be stolen in a protected form and security features subsequently defeated in an offline attack. Techniques for securing information and networks may also hinder access to the information and management of the data containing the information.

Consequently, there is a need for an information transmission technology that overcomes the vulnerabilities associated with compromised routers and standard encryption techniques.

SUMMARY

An object of the invention is to provide a method for transmitting information that is not vulnerable to a compromised router.

It is also an object of the invention to avoid dependence upon the use of standard encryption keys, while remaining consistent with the independent use of such keys.

A further object of the invention is to provide means of confirming that an end-to-end transmission of information has not been compromised at a router along the transmission route.

Another object of the invention is to associate protected information with a transmission route rather than an encryption key, where protection of the information is secured by being randomized, whether or not the information is also encrypted with a key.

The invention operates by identifying one or more nodes along a route for transmitting information from an upstream source to a downstream destination, associating with each identified node a stream of random data, combining at each identified node the received upstream data with the associated stream of random data, forwarding the combined data downstream, and cascading the random data streams associated with the identified nodes, so that the information from the combined downstream data at the downstream destination is recoverable by applying the cascade of the random data streams.

It is an aspect of the invention that the cascade of the random data streams can be constructed by the addition of the random data strings used at successive applications of respective random data streams to randomize the upstream data received at the respective nodes.

It is a further aspect of the invention to organize the storage and retrieval of the two intermediate products of the invention—the randomized downstream data and the cascade of the random data streams—in such a manner that retrieval of the intermediate products and recovery of the information is limited to a user of the invention, and to a user device which need not retain the information beyond any viewing necessary to satisfy the purposes of retrieval and recovery.

All examples, aspects and features mentioned in this disclosure can be combined in any technically possible way.

Some aspects of the invention reflect recognition that sensitive information transmitted using the invention may not be immediately recoverable at the receiving end because the information traversed a different path (switched through different routers/different "Software Defined Routing" (SDR) paths) and the cascade encryption will fail due to the addition or deletion of artifact data by intervening routers. For example, information transmitted by a military service from Washington D.C. to Boston Mass. may use transencryption based upon it being routed through Virginia, New York, and Boston between the origin and the terminus. If the data is diverted from one of these routers to a router in China, two things will happen: 1) the data received in Boston will not be recoverable (the transencryption will fail), and 2) the data received in China will also not be recoverable. The data received in China will be only a uniquely encrypted version of the encrypted data received by the specific router that routed the packet or stream to China. Without the artifact data of the "past and future routers" (all routers between Washington D.C. source router and Boston) all China has received is truly random data. Moreover, less reliance on security may be required. However, none of these aspects should be viewed as limiting.

Some aspects of the invention may be predicated in-part on recognition that the actual path data traveled in being routed (or passed in the case of SDR) from point A to point B can be uniquely determined by analyzing the artifact data. Some aspects of the invention may be predicated in-part on the recognition that data can be forced to be routed/passed through specific devices/software at the expense of being unrecoverable when received. However, none of these aspects should be viewed as limiting.

Some aspects of the invention may be predicated in-part on the recognition that the actual data path traveled in being routed is discoverable by using "discovery messages" ("DM"). Some aspects of the invention may be predicated in-part on the embedding of DMs throughout the data stream, causing a change in the Trans Encryption Value ("TEV") to be used with data received prior to or after the DM. Some aspects of the invention may be predicated in-part on pre-determination of the TEV for the pre-specified and required route. However, none of these aspects should be viewed as limiting.

In accordance with an aspect, an apparatus comprises: a data source in a restricted or unrestricted domain; at least one transencrypting router/("logical routing application" in SDR), collectively "TELRA"; zero or more intermediate TELRA; and a destination device or application in a restricted or unrestricted domain. Each TELRA comprising a program on transitory or non-transitory memory and a processor that runs the program, the program comprising a first function that uses received data S and random data R (fixed, and possibly unique, at least for the term of the complete message) on the TELRA. In some implementations the random data R is fixed at the factory and is potentially reprogrammable. In some implementations the random data R is a data stream received from an external device/application in an information-restricted or unrestricted domain that may or may not contain timing data for synchronization. The size of the random data R is shorter than, equivalent to, or longer than a size of the received data S. In some implementations the apparatus comprises a seed and a second function that generates the random data R from a seed, wherein the seed is shorter than the random data R and the generated random data R comprises a pseudorandom string of bits. In some implementations the apparatus comprises a second information-restricted domain comprising a storage device on which the seed or random data R is stored, and wherein the seed or random data R is not maintained in the first unrestricted domain when not in use. In some implementations the apparatus comprises a function that uses the random data R and received data S from the source side of the TELRA as inputs to generate the non-informational data Z as an output at the output side of the TELRA. In some implementations this non-informational data Z is forwarded to the next TELRA (and becomes source data S to that TELRA). In some implementations the first function comprises an XOR (exclusive OR) function. In some implementations the program code triggers generation of the new random data R based on a signal contained in the data stream, or via an out-of-band control channel.

In accordance with an aspect a method comprises: a method of generating a "Trans Encrypting Value" (TEV) by computing the total encryption caused by the individual intermediate TELRA by summing the random data R(s) by utilization of a second function. In some implementations this second function will be the XOR (exclusive OR) function.

In accordance with an aspect a method comprises: a method of recovering the originally transmitted information by the utilization of the received information and the TEV by a third function. In some implementations this third function will be the XOR (exclusive OR) function.

DETAILED DESCRIPTION

Figure 1:
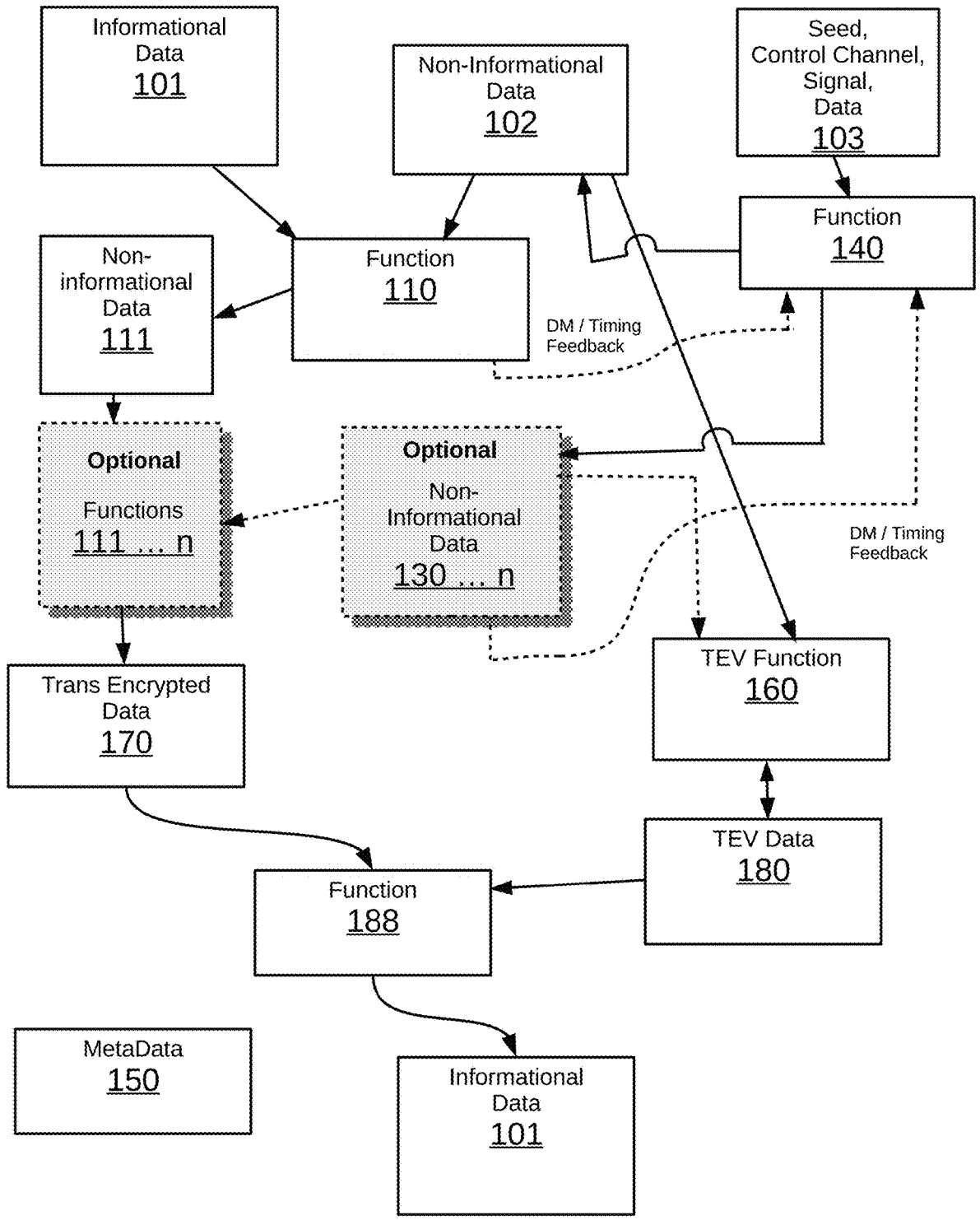
FIG. 1 is a block diagram illustrating the transmission of information from a source through one or more TELRA to a destination and recovery of the original information by utilization of the TEV.

Some aspects, features and implementations may comprise computer components and computer-implemented steps or processes that will be apparent to those of ordinary skill in the art. It should be understood by those of ordinary skill in the art that the computer-implemented steps or processes may be stored as computer-executable instructions on a non-transitory computer-readable medium. Furthermore, it should be understood by those of ordinary skill in the art that the computer-executable instructions may be executed on a variety of physical processor devices. For ease of exposition, not every step, process or element is described herein as part of a computer system. However, those of ordinary skill in the art will recognize steps, processes and elements that may have a corresponding computer system or software component. Such computer system and software components are therefore enabled by describing their corresponding steps, processes or elements, and are within the scope of the disclosure.

The term "transencrypting" refers to a particular technique for transforming information so as not simply to encrypt it (i.e. with a key) but to randomize the information's bit stream in such a manner that a series of such transformations can be reversed—and the information recovered—by a single inverse operation whose operator is computed by executing the transformations not on the information but on the randomizing bit steams at each transformation in the series. It is a self-randomizing sequence. An illustrative example will suffice. Assume information A is transformed into non-information A1 by randomizer R1, and A1 is transformed into A2 by randomizer R2, and A2 is transformed into A3 by randomizer R3. To recover information A from randomized non-information A3, it is necessary to construct a self-randomized inverter, M: transform randomizer R1 (which is also M1) into M2 using randomizer R2, and M2 is transformed into M3 using randomizer R3. Information A is recovered from randomized non-information A3 by using self-randomized inverter M3. It should be noted that information A could also be recovered from non-information A2 by using self-randomized inverter M2, and similarly from non-information A1 by using inverter M1. The technique contemplates at least one randomizing transformation between a source of the information and a destination. Any number of additional randomizing transformations can be combined together in the manner illustrated above in what is herein called a "cascade" based, for example and typically, on router specific randomizing bit streams applied at successive routers on transit from a source to a destination. This technique can be flexibly applied to simulate a simple model where information is randomly duplicated into two parts, neither of which contains any information. The parts may be stored separately, at locations known only to a user or only accessible by a user of the invention, and can be retrieved and combined by that user to recover the information. In this view of the results of operation of the invention, the information itself disappears and is never available as such either in transit or in storage, greatly reducing exposure of networks and data storage facilities to compromise of the information. Even when the information is recovered by a user of the invention, there is no need to retain a copy of the information once the purpose of viewing the information has been served. This aspect of the invention allows further information security safeguards to be focused on the user's use of the invention, without having to be concerned about the security of networks and data storage facilities, which do not have access to the information.

FIG. 1 is a block diagram illustrating the steps in transencrypting information, and subsequent regeneration of that information. All blocks in the illustrated example may be in an information-restricted or an unrestricted domain. A domain may be associated with any of a variety of things including but not limited to a network or computer security domain, country, state, geographical territory, geographical location, business entity, network, network node, data center, application, computing device, server, server cluster. Informational data 101 is data that contains information that can be understood or used by a person, device or computer program.

For example, informational data could be a digital representation of sensitive information such as a name of a person and some of their personal information such as home address, social security number and credit card numbers, for example and without limitation. Non-informational data 102 is data that does not contain information that can be understood or used by a person, device or computer program. For example and without limitation, non-informational data 102 may be a random string of bits or numbers. Non-informational data 102 is data that is non-informational with respect to informational data 101, e.g. and without limitation a random string of bits or numbers, an audio file, a text file or some other data that might be understood or used by a person, device or computer program but which is non-informational with respect to informational data 101. Informational data 101 and random data (non-informational data) 102 are used as inputs by a function 110 (TELRA) to generate the corresponding non-informational data 111. In other words, the function 110 removes the information from the informational data. The resulting non-informational data 111 may then be transmitted to subsequent function(s) 112 . . . n which are individually supplied with non-informational data 130, . . . n, each function 112 . . . n will re-generate new non-informational data to be supplied as input to the subsequent stage. Note the foregoing notational convention, which is used in the remainder of this disclosure and in the drawings. The form "130 . . . n" and the form "112 . . . n" are shorthand for "130a, . . . 130n" and "112a, . . . 112n", respectively.

The system implementing each stage can be co-located, in the same or a different security domain, in the same or a different country for example and without limitation. The only requirement is that the output of one stage can be transmitted to the input of the next stage. Transition of at least one function 110 is required but the actual number of transition functions is unlimited. Because the data being transmitted is non-informational it may be transmitted without at least some of the cumbersome data management and security techniques that are applied to informational data. The output result of this chain of one or more functions 110 . . . n is non-informational data (Trans Encrypted Data) 170.

FIG. 1 also illustrates in block format the steps required to compute the Trans Encryption Value ("TEV"). The non-informational data (random data) supplied to each function 110 . . . n is supplied to the TEV Function 160. This non-informational data 102, 130 . . . n is supplied to the TEV Function 160 via open transmission, out of band transmission, or historical remembrance, for example and without limitation.

FIG. 1 also illustrates in block format the provision of signals/data that will cause reset or re-computation of the noninformational data 102, 130 . . . n. This signal or data 103/DM/Timing Feedback can be supplied via in band data, out of band data, or timing signal etc. for example without limitation. This signal or data 103 can modify or cause regeneration of the non-informational data 102,130 . . . n.

The informational data 101 can be retrieved by using function 188 in a restricted or unrestricted domain, a permitted domain or authorized domain. The Trans Encrypted data ("TED") 170 and the TEV data 180 are provided as inputs to function 188 to regenerate the informational data 101. Those of ordinary skill in the art will understand that certain functions may utilize a first set of random data 102, 130 . . . n for generating the non-informational data 111 . . . n and 170 and a different second random data TEV 180 for regenerating the informational data from the non-informational data 170. It is not required that either random data 102, 130 . . . n, Trans Encrypted Data ("TED") 170 nor TEV 180 ever be present simultaneously in any domain (in a non-limiting contextual example, all non-informational data 102, 130 . . . n and TED 170 may be maintained in separate jurisdictions individually and TEV 180 may be maintained in yet another final jurisdiction, preventing subjecting the information to the laws of any jurisdiction), at least in some implementations.

A wide variety of functions may be used as the functions 110, 111 . . . n to generate the non-informational data 111 . . . n, 170 from the informational data or chained non-informational data. In one example the information removal function 110 is an XOR (exclusive OR) function. The XOR function outputs a logical "1" only when the inputs differ, e.g. (random data 111, informational data) inputs of (1,0) or (0,1). Thus, the bits of the random data. R may be XORed with the bits of the informational data to generate the non-informational data.

A wide variety of functions may be used as the function 160 to generate the TEV 180 from the non-informational data 102, 130 . . . n. In one example the information TEV function 160 is an XOR (exclusive OR) function. The XOR function outputs a logical "1" only when the inputs differ, e.g. (random data 111, informational data) inputs of (1,0) or (0,1). Thus, the bits of the random data R may be XORed with the bits of the informational data to generate the non-informational data.

A wide variety of functions may be used as the function 188 to regenerate the informational data 101 from the TED 170 and the TEV 180. In one example the information restoral function 188 is an XOR (exclusive OR) function.

The XOR function outputs a logical "1" only when the inputs differ, e.g. (random data 111, informational data) inputs of (1,0) or (0,1). Thus, the bits of the random data R may be XORed with the bits of the informational data to generate the non-informational data.

In some implementations the random data 102, 130 ... $n$ are pseudorandom values of the same or greater size as the informational data 101. For example, the random data 102, 130 ... $n$ may be a pseudorandom string of bits that is generated by a DRBG (deterministic random bit generator) function 140 from a DRBG seed value 103 that may be the same size as, larger than, or smaller than the random data 102, 130 ... $n$, and smaller, the same size, or larger than the informational data 101. The seed 103 may be a random value, a timing generated value, a data feedback value, etc. although that should not be viewed as a limitation. A given value 103 will generate the same random data 102, 130 ... $n$ each time function 140 is invoked, and different values 103 will generate different random data 102, 130 ... $n$. Because the value 103 can be smaller than the informational data 101 102, 130 ... $n$ it is possible to reduce incurred storage and transmission costs. Moreover, the random data 102, 130 ... $n$ may be generated and used on-the-fly so that it is not necessary to have the entire random data 102,130 ... $n$ instantiated at any given time. The seed 103 may be maintained in storage or in a device implementing functions 110, 111 ... $n$ or moved from an information-restricted domain and used as needed to regenerate the random data 102, 130 ... $n$ using the Function 140. In some implementations the value 103 is maintained in a different information-restricted domain than the information-restricted domain in which the non-informational data 102 is stored. Random data 102, 130 ... $n$ may be shared, e.g. and without limitation by maintaining separate copies (or the ability to generate copies) in different domains. Metadata 150 that associates a particular seed and method, timing value source and method, data feedback source and method, etc. without limitation with a particular corresponding non-informational data 102, 130 ... $n$ may be maintained in the unrestricted domain.

In some implementations the random data 102, 130 ... $n$ is arbitrary but meaningful digital data such as data from video files, audio files, text files, data pulled from an arbitrary website anywhere on the web, or some other data that while meaningful in some aspect is still arbitrary and non-informational with respect to the informational data 101. Whatever data is used as a source for random data 102, 130 ... $n$ may optionally be used with an offset starting point, multiple offsets, or any of a wide variety of techniques that might randomize the data selected therefrom as random data 102, 130 ... $n$.

Figure 2:
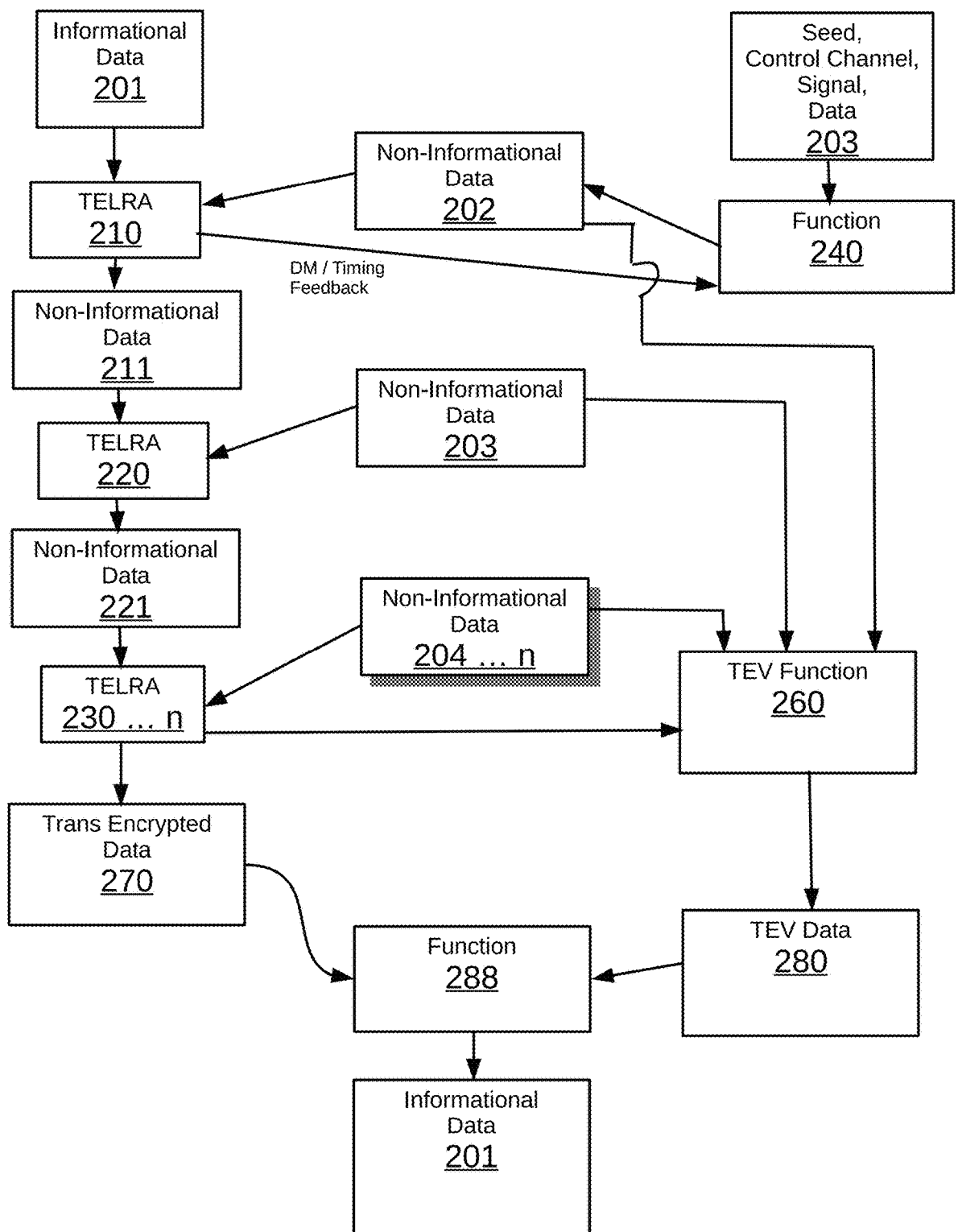
FIG. 2 illustrates the re-generation of random data R by use of a function or from an external source.

FIG. 2 illustrates a cascade of transencrypting routers/ ("logical routing applications" in SDR), collectively "TELRA" in which transencryption recovery of information from data may be implemented. The cascade includes at least one TransEncrypting Router or Logical Routing Application, but is unlimited in the total number of such devices/applications in the cascade. Each TELRA 210, 220, 230 ... $n$ may exist in a physically or logically different jurisdiction and may or may not be in a secure or restricted domain. Each TELRA 210,220, 230 ... $n$ is supplied with one or more non-informational data (202, 203, 204 ... $n$) of a not necessarily unique 1) key (for DRNG); 2) random data (non-informational with respect to the informational data); 3) signal; 4) factory assigned key; 5) other random source without limitation. The non-informational data used by each TELRA (whether externally generated (203→240→202), internally generated (230), or factory supplied (230) is Supplied to the TEV Function 260. In some implementations the TELRA (210, 220, 230 ... $n$) function comprises an XOR (exclusive OR) function. In some implementations the TEV function 260 comprises an XOR (exclusive OR) function. In some implementations the 288 function comprises an XOR (exclusive OR) function. The method of supplying the non-informational data to the 260 TEV function can be 1) predetermined and directly supplied by an administrator; 2) in-channel transmission; 3) out of band transmission; 4) historically remembered; or 5) etc. without limitation.

Non-informational data 202, 203, 204 ... $n$ is not necessarily unique, but is non-informational with respect to the informational data 201. In some implementations the random data 202, 203, 204 ... $n$ is arbitrary but meaningful digital data such as data from video files, audio files, text files, data pulled from an arbitrary website anywhere on the web, or some other data that while meaningful in some aspect is still arbitrary and non-informational with respect to the informational data 201. Whatever data is used as a source for random data 202, 203, 204 ... $n$ may optionally be used with an offset starting point, multiple offsets, or any of a wide variety of techniques that might randomize the data selected therefrom as random data 202, 203, 204 ... $n$.

In some implementations non-informational data 202, 203, 204 ... $n$ may consist of data (including files, data streams, or signals) supplied to the TELRA 210,220, 230 ... $n$. In some implementations this non-informational data 202,203,204 ... $n$ may consist of a key, seed, or random data which is maintained in a secured environment or domain. In some implementations the key, seed, or random data may be utilized by the TELRA 210, 220, 230 ... $n$ to generate a random string of non-informational data using a DRNG ("Deterministic Random Number Generator"). In some implementations the TELRA may have a factory installed (or installation determined) random string that can be used as the non-informational data, or as a key to generate a random string utilizing a DRNG. In some implementations this factory installed (or installation determined) random string can be supplied to the TEV Function 260 at installation time, or stored in a database accessible by the TEV function 260. Because no informational data transits any device after TELRA 210 in some implementations the administration, maintenance, inspection, and replacement of all TELRA devices and device(s) implementing the TEV function are able to be performed by uncleared (not security vetted/authorized) personnel; no sensitive information transits the TransEncrypting chain. In another example, without limitation, the devices implementing the TELRA functions, the TEV function, and the 288 function can be administered by a single individual or team without compromising "Separation of Duties" because none of these functions deal with information, they only deal with non-informational data.

In at least one implementation the station or application implementing function 288 thereon could be an unrestricted domain. For example, restoration of the informational data 201 could be limited to a particular administration workstation or application. The TEV data 280 could be known or unknown to a user, or generated on-the-fly before putting it into a different domain or jurisdictional environment visible to the end user or application, such as in a one-time-use scenario, and the on-the-fly seed and/or data could be overwritten as it is read. The TEV data 280 could be available to the administration station or application but unknown to the user, or known to the user and maintained by the administration station or application only when necessary, e.g. inputted by the user and deleted from the administration station or application when not in use. Such techniques are not limited to use with administration stations.

Various procedures associated with data transmission and security may be used in conjunction with the concepts described herein. For example and without limitation, encryption and compression, either alone or in combination, may be implemented on one or more of the informational data, non-informational data, random data 202 . . . n, seed and combinations thereof. Encryption and compression techniques are well understood by those of ordinary skill in the art.

Figure 3:
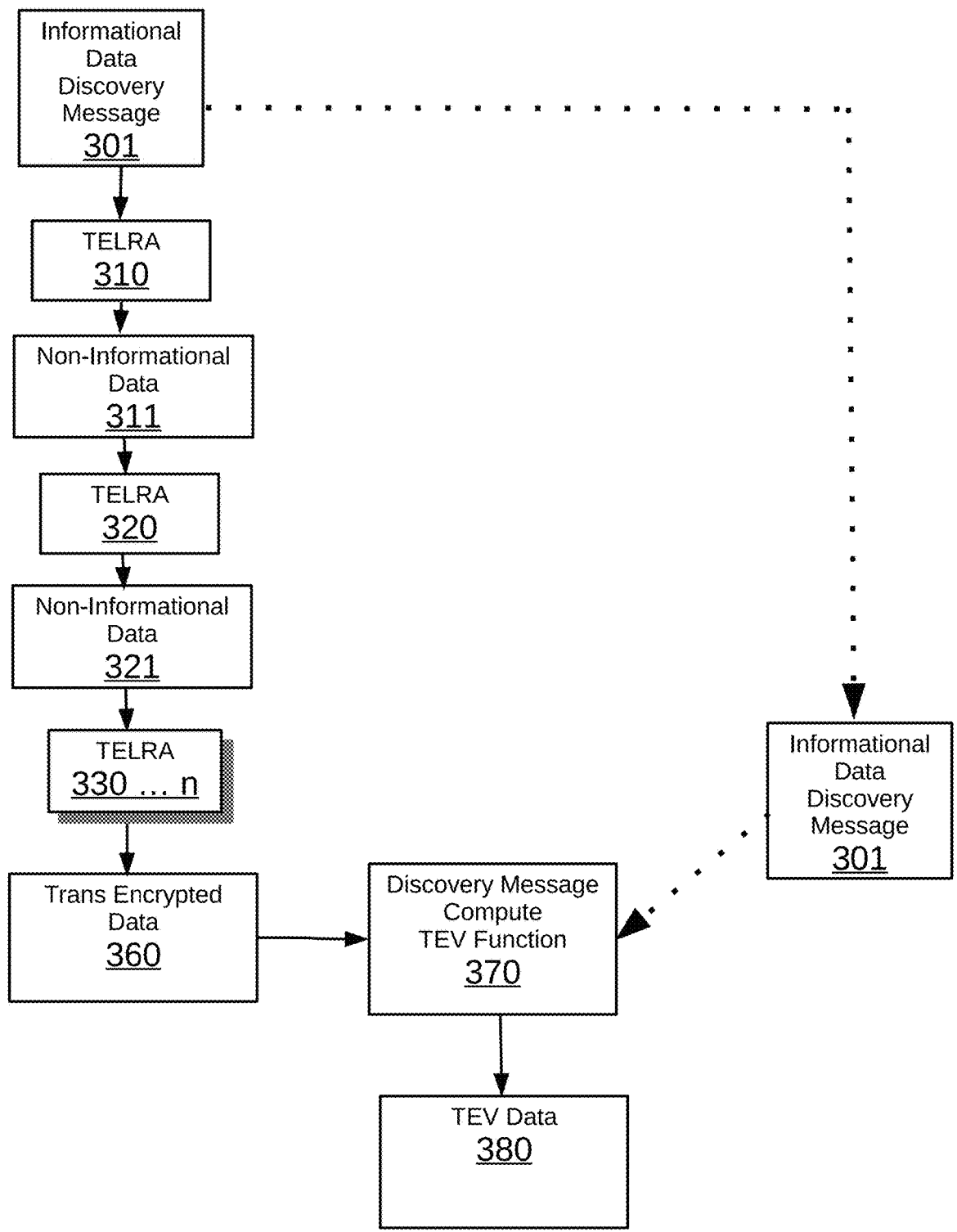
FIG. 3 illustrates the generation of a TEV by discovery message exchange between the information source and the information recipient.

Referring now to FIG. 3, an informational discovery message ("DM") may be delivered from an informational origin to a local or remote Discovery Message TEV Function ("DMTEV") by two separate methods, one of which methods must be the actual TransEncryption chain used/to be used by the actual transmission of the TED. This delivery can be before, after, or during the transmission of the cascade encrypted informational data. This DM can be data of any type, meaningful, random, a pointer or key to a locally/remotely stored message, standardized, etc. The second method of delivery can be by any method (out of band, in band, alternate channel, historical remembrance, etc without limitation), and may be encrypted, compressed or otherwise handled utilizing many functions well known to those conversant in the state of the art. The only requirement of the second transmission method is that the original discovery message 301 is able to be reproduced or discerned in its entirety with precision and without loss or addition of bits (or signal). Once the DM in TED format and the DM received by the second format are present in the Discovery Message Compute TEV Function 370, the TEV Data 380 can be computed. In some implementations the 370 DMTEV function comprises an XOR (exclusive OR) function.

Figure 4:
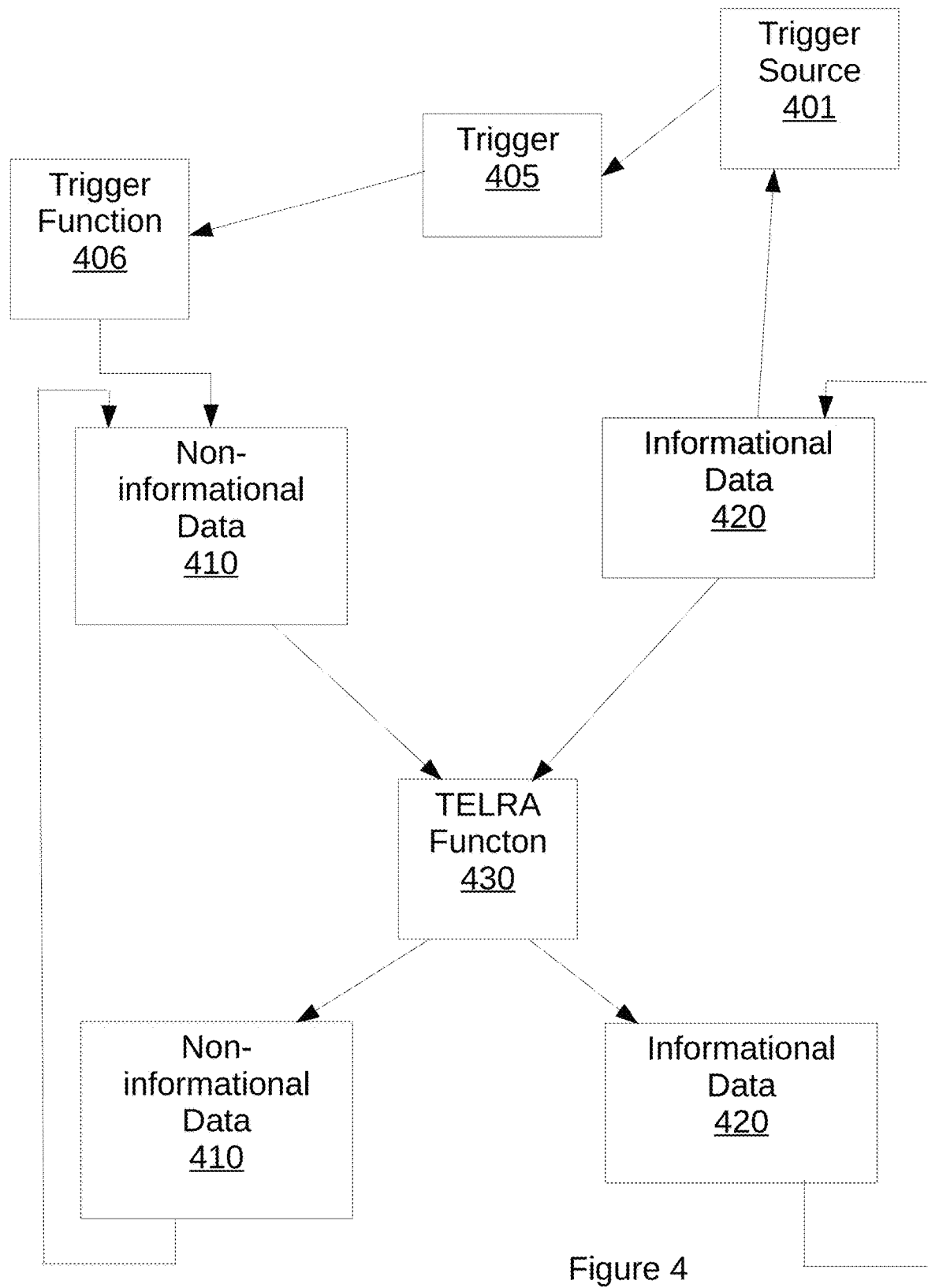
FIG. 4 illustrates the generation of new non-informational data based upon a trigger condition.

Referring now to FIG. 4, new random data 410 and new non-informational data 450 may be generated in response to a trigger condition 405 such as a timing, out-of-band signal, in-band signal, etc. for example and without limitation. In the illustrated example a trigger source or condition 405 such as a timing, out-of-band signal, in-band signal etc. causes a regeneration of non-informational data 410. The trigger condition prompts the generation of a new non-informational data 410. The new non-informational data 410 Is inputted to the TransEncryption Function 430 causing new non-informational data 410 to be generated.

The trigger operation changes at least some of the informational (first time through)/non-informational data 420. The trigger operation also prompts generation of a new random data 410. The new random data 410 and post-write informational data are inputted to the TransEncryption function 450 to generate new non-informational data 402. The procedure may be repeated on each occurrence of trigger 405, caused by the same or a different condition that caused the previous trigger.

In some implementations a TELRA 110, 130, 210, 220, 230 . . . n, 310, 320, 330 . . . n, 430 may be programmed such that when a particular sequence, such as a keyword, a pattern, or any other sequence for example and without limitation transits the TELRA it is "masked" by overwriting the sequence with data in any form except the actual data in that sequence such that when the message is received by the information recovery function 188, 288 that sequence is randomized and not recoverable. This may be done or repeated by multiple TELRA in sequence to allow for defense in depth. This will allow, for example without limitation information/non-informational data to be routed through multiple independent jurisdictions or domains, each of which has unique/non-unique information redaction protocols, such that each jurisdiction or domain without limitation may modify the transmission in sequence randomizing/re-randomizing their unique/non-unique data sequences prior to release of the non-informational data to the next TELRA or end recipient. These "masks" are cumulative. Since each "mask" is regenerated by a random function as each message transits a TELRA, the DM message will have different redaction sequences than any other message transiting the same TELRA, so the DMTEV function will fail in these sequences leaving them unrecoverable/discernable.

In some implementations a tracking key may be inserted in place of/in addition to the randomized data overwriting the sequence or any place in the message by design. This tracking key which may contain TELRA designation, time, source IP, etc. without limitation will be recoverable by the recipient of the informational data 101 using methods well known by those conversant in the art.

In some implementations there are features that restrict re-generation of the informational data to a particular domain. For example, preventing random data 102, non-informational data 111 or a mask from being present outside a domain will tend to restrict re-generation of some or all of the informational data to that domain. This may be accomplished in a wide variety of different ways such as, for example and without limitation, associating the random data 102, non-informational data 111, mask, or any combination thereof with domain hardware. In one example the random data 102, non-informational data 111 or mask could be the MAC address (or some variation thereof) of a workstation that is in the domain (discoverable by routing protocols well known to those conversant in the art). User or group specific encoding of random data 101 and non-informational data 111 could also be implemented utilizing directory functionality well known to those conversant in the art. Avoidance of transmission of informational data outside of a particular domain may help to enhance security.

A number of features, aspects, embodiments and implementations have been described. Nevertheless, it will be understood that a wide variety of modifications and combinations may be made without departing from the scope of the invention described herein. Accordingly, those modifications and combinations are within the scope of the following claims.

What is claimed is:

1. A method comprising:
Inserting informational data into a network of transmission nodes;
receiving at a node data from an upstream node;
combining the received data with a stream of random data, thereby randomizing the received data, said stream of random data having been associated with the node;
forwarding the combined data downstream;
wherein the node is one of one or more nodes identified along a route for transmitting information from an insertion point at an upstream source node to a downstream destination;
wherein each of said one or more nodes is associated with a stream of random data; and
wherein each of the associated streams of random data for each of said one or more nodes along said route are combined into a cascade, such that the informational data inserted into said network is recoverable by combining randomized data at the downstream destination with the cascade.

2. The method of claim 1, wherein each random data stream is constructed from a seed using a function that generates a pseudorandom string of bits from the seed.

3. The method of claim 1, wherein the combination at each identified node is obtained by a function that combines the received upstream data with the associated random data stream.

4. The method of claim 3, wherein the cascade of the random data streams is obtained by a function that combines the random data streams associated with successive nodes.

5. The method of claim 4, wherein the function that combines at each identified node operates by an XOR of the received upstream data with the associated random data stream, wherein at least one subset of bits of the random data stream masks corresponding informational data, and wherein the function that generates a cascade operates by an XOR of each of the random data streams associated with successive nodes.

6. The method of claim 1, wherein the upstream source node is a computing device and the received upstream data for the source node is the information to be TransEncrypted for transmission to the downstream destination.

7. The method of claim 1, wherein all nodes but the first are routers and a discovery message is used to determine the actual data path traveled.

8. The method of claim 1, wherein the downstream destination is a first storage location, the cascade of the random data streams of all the identified nodes is stored in a second storage location, and said first and second storage locations are known simultaneously only at a computing device of a user.

9. The method of claim 8, wherein said user computing device is a portable storage device containing said first and second storage locations and a loadable program module for recovering the information by applying the cascade retrieved from said second storage location to the combined downstream data retrieved from said first storage location.

10. The method of claim 9, wherein said loadable program module allows only transitory storage or display of an electronic copy of the information.

11. An apparatus comprising:
a network of transmission nodes;
means for identifying one or more nodes along a route within said network for transmitting informational data inserted into said network along said route from an upstream source node to a downstream destination;
means for associating with each identified node a stream of random data;
means for combining at each identified node received upstream data with the associated stream of random data;
means for forwarding the combined data downstream;
means for cascading the random data streams associated with the identified nodes, wherein the informational data inserted into said network and randomized into the combined downstream data at the downstream destination is recoverable by applying the cascade of the random data streams.

12. The apparatus of claim 11, wherein each random data stream is constructed from a seed using a function that generates a pseudorandom string of bits from the seed.

13. The apparatus of claim 11, wherein the combination at each identified node is obtained by a function that combines the received upstream data with the associated random data stream.

14. The apparatus of claim 13, wherein the cascade of the random data streams is obtained by a function that combines the random data streams associated with successive nodes.

15. The apparatus of claim 14, wherein the function that combines at each identified node operates by an XOR of the received upstream data with the associated random data stream, wherein at least one subset of bits of the random data stream masks corresponding informational data, and wherein the function that generates a cascade operates by an XOR of each of the random data streams associated with successive nodes.

16. The apparatus of claim 11, wherein the upstream source node is a computing device and the received upstream data for the source node is the information to be TransEncrypted for transmission to the downstream destination.

17. The apparatus of claim 11, wherein all nodes but the first are routers and a discovery message is used to determine the actual data path traveled.

18. The apparatus of claim 11, wherein the downstream destination is a first storage location, the cascade of the random data streams of all the identified nodes is stored in a second storage location, and said first and second storage locations are known simultaneously only at a computing device of a user.

19. The apparatus of claim 18, wherein said user computing device is a portable storage device containing said first and second storage locations and a loadable program module for recovering the information by applying the cascade retrieved from said second storage location to the combined downstream data retrieved from said first storage location.

20. The apparatus of claim 19, wherein said loadable program module allows only transitory storage or display of an electronic copy of the information.

* * * * *